Sept. 30, 1952 G. P. BRIDGEFIELD 2,612,341
AXIALLY MOVABLE ROTARY PLUG
Filed May 10, 1948 3 Sheets-Sheet 1

Inventor.
Guillermo P. Bridgefield by Jas. Imirie
Atty.

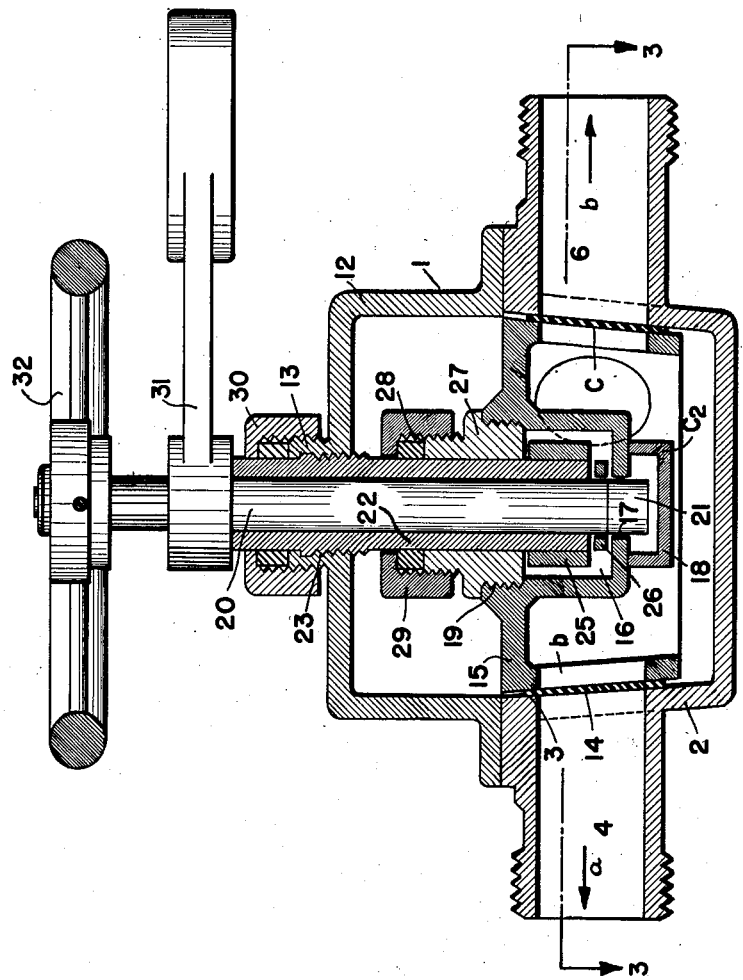

Patented Sept. 30, 1952

2,612,341

UNITED STATES PATENT OFFICE 2,612,341

AXIALLY MOVABLE ROTARY PLUG

Guillermo Palacios Bridgefield, Mexico City, Mexico

Application May 10, 1948, Serial No. 26,067
In Mexico May 27, 1947

2 Claims. (Cl. 251—97)

This invention relates to a valve structure wherein the valve per se and its casing are provided with openings or ports for directing fluid to selected pipe lines leading from the casing.

The object of the invention is to provide a valve structure wherein the valve per se can be slightly removed from its seat to permit of its being axially moved to direct the flow of fluid to one or several openings to feed fluid to the pipes and lowered and locked in its seat when the selection of flow has been made.

A further object of the invention is to provide in a valve structure means for slightly raising the valve per se from its seat, associated with separate means for axially moving the valve to register with selected openings for flow of fluid, and after the selection is made, lower the valve in its seat to lock it in the selected position.

In the drawings:

Figure 2 is a central vertical section of the valve structure.

Figure 3:
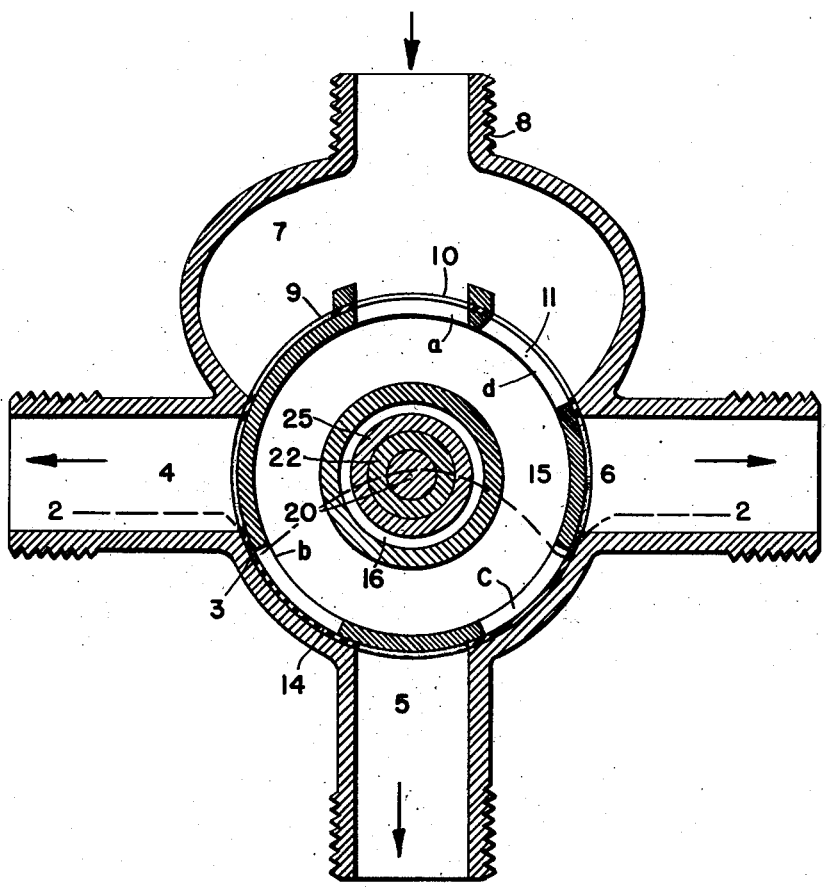
Figure 3 is a horizontal section on the line 3—3 of Figure 2.
Figure 1:
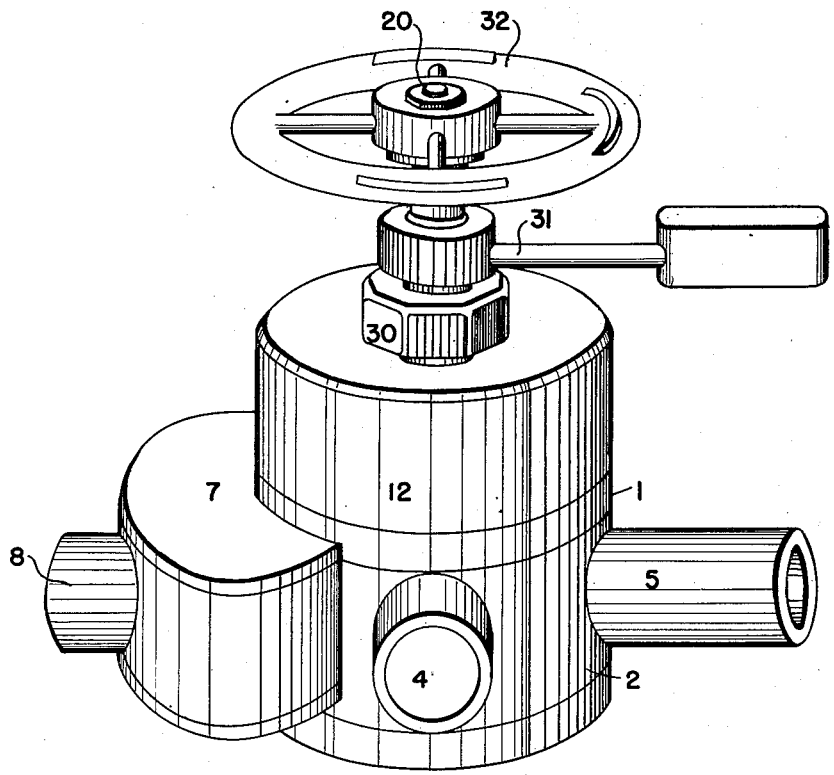
Figure 1 is a perspective view of the improved valve structure.

In the drawings 1 represents a two-part casing, the lower cylindrical section 2 is conical internally to provide a valve seat 3 and from its periphery extend pipes 4—5 and 6, and a chamber 7, provided with a nipple inlet 8 and three inlet ports 9, 10 and 11.

An upper section 12 of the casing fits over, and is bolted to the lower section 2 and projecting from its upper end is an externally and internally threaded nipple 13.

Surrounding the valve seat is a gasket 14 and fitting in the valve seat 3 is a rotatable hollow valve 15 formed with openings $a$—$b$, $c$ and $d$.

In the center of the lower valve section 2 is valve 15 provided with a well 16, well 16 having a bottom formed with a square opening 17, and below the well is a cap 18 and in the top of the valve is a threaded opening 19.

A valve stem 20 having a square end 21 fits in the square opening 17 in the bottom of the well, and surrounding this stem is a sleeve 22 threaded at 23 to engage the internal threads on the nipple 13. The lower end of the sleeve is provided with a collar or nut 25, and between the nut and the well is a washer 26. A threaded plug 27 is mounted on the sleeve and engages the internal threads in the opening 19. Thus the nut or collar 25 is confined between the bottom of the plug 27 and the well, to hold the sleeve in position in the casing.

The top of the plug 27 is threaded at 28 to receive a threaded packing nut 29. A packing nut 30 is mounted on the sleeve 22 and engages the threaded nipple 13 and at the upper end of the sleeve, above the packing nut 30 is a handle 31 to rotate the sleeve, to lift the valve from its seat, as will be explained later on.

The upper end of the stem 20 is provided with a hand wheel 32 by means of which the valve 15 can be rotated to register with selected openings $a$, $b$, $c$ and $d$ in the casing.

In operation, assume the parts are in the position shown in Figure 3 and fluid is fed to the receiving chamber 7. The fluid will pass through openings 10 and $a$ and openings 11 and $d$ to the valve. At this time openings 9—$b$—$c$ and pipes 4, 5 and 6 are closed, and the valve is locked seated in the lower section 2 of the casing.

If it be desired to position the valve to direct the fluid through pipe 4, the handle 31 is first turned, which through the threaded connection 23, the sleeve 22 and the valve 15 are raised, sufficiently to break the seal with the valve seat. Then the hand wheel 33 and stem 20, which directly carry the valve 15, are rotated to register openings 9 and $d$ and openings 11 and $c$ and opening $a$ and pipe 4. Then the handle 31 is reversed to engage the valve with its seat.

If it be desired to feed the fluid from chamber 7 to pipe 5, the lever 31 is turned to lift the valve from its seat, and the hand wheel 33 is turned to rotate the valve to register openings 9 and $c$ and 11 and $b$ and opening $a$ of the inlet of pipe 5. When registration of the openings is made, the handle 31 is turned to lower and lock the valve in its seat.

If fluid is to be directed through pipe 6, the valve is lifted from its seat and the hand wheel 33 is turned to register the openings 9 and $b$—$a$ and opening of pipe 6.

To determine the selected registration of the various openings, the handle 33 is provided with indicating indicia, which may be in the form of slight projections, each indicating one of the pipes 4, 5 and 6.

From the foregoing description it is evident I have provided a unique valve which may be conveniently used to control the flow of fluid in selected pipes.

I claim:

1. A valve comprising a valve casing having an internally threaded opening and a conical valve seat and at least one opening therethrough, a gasket lining said valve seat and having at least one opening coinciding with said seat opening, a sleeve having external threads to engage the threaded opening in said casing, a hollow conical valve plug carried by said sleeve in said casing for cooperation with said gasketed valve seat, said plug having at least one radial opening therein for cooperation with the seat opening, a handle on said sleeve beyond said casing, a shaft journalled in said sleeve and keyed to said plug beyond the inner end of said sleeve, and a second handle on the outer end of said shaft beyond the outer end of said sleeve, whereby operation of said first handle will axially move said valve plug relative to said gasketed seat, and actuation of said second handle when said plug is retracted from said seat will rotate said plug relative to said seat.

2. A valve as set forth in claim 1 wherein said seat and plug comprises a plurality of openings defining an inlet and a plurality of outlets, said second handle comprises a handwheel, and protrusions are provided on said handwheel to respectively identify the openings in said valve plug.

GUILLERMO PALACIOS BRIDGEFIELD.

REFERENCES CITED

The following references are of record in the file of this patent:

UNITED STATES PATENTS

| Number | Name | Date |
|---|---|---|
| 512,892 | Munger | Jan. 16, 1894 |
| 543,173 | Coale | July 23, 1895 |
| 632,934 | Ashley | Sept. 12, 1899 |
| 2,389,000 | Roberts | Nov. 13, 1945 |

FOREIGN PATENTS

| Number | Country | Date |
|---|---|---|
| 159,922 | Great Britain | of 1921 |